US006853399B1

(12) United States Patent
Gilman et al.

(10) Patent No.: US 6,853,399 B1
(45) Date of Patent: Feb. 8, 2005

(54) KITCHEN APPLIANCE WITH VIDEO DISPLAY

(76) Inventors: Robert A. Gilman, 121 Overlook Ave., Wayne, NJ (US) 07470; Keith E. Gilman, One Brandywine Ct., Scotch Plains, NJ (US) 07076

( * ) Notice: Subject to any disclaimer, the term of this patent is extended or adjusted under 35 U.S.C. 154(b) by 0 days.

(21) Appl. No.: 09/579,030

(22) Filed: May 26, 2000

(51) Int. Cl.[7] ................................. H04N 9/47
(52) U.S. Cl. ......................................... 348/61
(58) Field of Search ............... 348/61, 552; 345/158; 725/110; H04N 9/47

(56) References Cited

U.S. PATENT DOCUMENTS

| 4,224,615 | A | * | 9/1980 | Penz | 345/174 |
|---|---|---|---|---|---|
| 4,628,351 | A | | 12/1986 | Heo | 358/93 |
| 5,382,939 | A | | 1/1995 | Hong | 340/309 |
| 5,926,168 | A | * | 7/1999 | Fan | 345/158 |
| 6,282,714 | B1 | * | 8/2001 | Ghori et al. | 725/81 |
| 6,370,890 | B2 | * | 4/2002 | Roh et al. | 62/126 |
| 6,490,726 | B2 | * | 12/2002 | Harrison et al. | 725/110 |
| 6,498,567 | B1 | * | 12/2002 | Grefenstette et al. | 340/825.62 |
| 6,559,882 | B1 | * | 5/2003 | Kerchner | 348/61 |
| 2002/0080273 | A1 | * | 6/2002 | Harrison et al. | 348/552 |

* cited by examiner

Primary Examiner—Nhon Diep
(74) Attorney, Agent, or Firm—Lerner, David, Littenberg, Krumholz & Mentlik, LLP

(57) ABSTRACT

A kitchen appliance such as a cooking or cleaning apparatus includes video or other electronic image display built within the door of the appliance or a side or other surface of an appliance. Controls for the display and the video or still-frame generating apparatus associated therewith are either built directly within the appliance and/or are associated via remote control, including an infrared receiving port. The display could be fed from a television tuner, microprocessor or any other video or still frame generating apparatus.

16 Claims, 1 Drawing Sheet

KITCHEN APPLIANCE WITH VIDEO DISPLAY

BACKGROUND OF THE INVENTION

The present invention relates generally to kitchen appliances such as cooking or cleaning apparatus, which incorporate a display for displaying video or other electronic images generated from video or still-frame generating apparatus.

Everybody gathers in the kitchen. Kitchens necessarily include appliances for the storage, preparation and cleanup of meals and snacks. These include conventional ovens, convection ovens, microwave ovens, rotisseries, dishwashers, wine storage units, refrigerators, refrigerator drawer units, freezers, etc. With the kitchen being the central area in many homes, other devices are often desirable in the kitchen. These include televisions, computers, security camera displays and other video display devices. These devices take additional counterspace or other space in the kitchen, whether it be on a desk in the kitchen, on the counter, mounted under the cabinets or on stand alone tables.

Existing appliances do not incorporate video display units in such a manner that effective viewing is enabled. U.S. Pat. No. 5,382,939 electronically combines a microwave oven and television, whereby the cooking status can be displayed on a separate television set. A display on the television, typically in a family room, indicates the status of that being cooked in the microwave oven. U.S. Pat. No. 4,628,351 discloses a microwave oven having a video display in the form of a Braun tube, with extensive processing stages involved. The video display in the form of a Braun tube is quite small relative to the planar real estate occupied by the microwave oven, as can be clearly seen in FIG. 1. Also, the video display in the form of a Braun tube is on a non-moving panel portion of the microwave oven, which is normally reserved for controls and door-opening mechanisms. Many other appliances do not provide such non-moving panels at all, and if they do the panels are quite small so that the area of the appliance used for the storage, preparation or cleanup of meals is maximized. The disclosures of these patents are incorporated herein by reference.

An appliance incorporating a video display, such as that associated with a television or computer or camera, in a manner which permits effective viewing is desirable.

SUMMARY OF THE INVENTION

A kitchen appliance includes a housing having an interior, appliance controls and a door, the door being movable between an open position at which the interior can be accessed and a closed position, the kitchen appliance having an apparatus in the housing for effecting the environment of the interior, as controlled by the appliance controls, and a display built within the door of the appliance for displaying electronic images. The kitchen appliance apparatus for effecting the environment of the interior need not be within the housing, but may be separate therefrom. The appliance may also include a television tuner or a microprocessor, a keyboard or other controls for controlling the microprocessor may be provided as well. Video generating apparatus of any time may be included, such including a camera. It is recognized that while the appliance may include these or other various devices described herein or known, now or later, to those of skill in the art, the devices need not be incorporated within the appliance itself, and could be simply part of the appliance as a system for utilizing the display on the door. In connection with another aspect of the present invention, a kitchen appliance includes a housing with an interior, a planar surface, appliance controls and a door, the door being movable being an open position at which the interior can be accessed and a closed position, the kitchen appliance including an apparatus in the housing for effecting the environment of the interior, as controlled by the appliance controls, and a display on the planar surface. In one embodiment of the invention, the display covers about at least one-quarter of the planar surface. In another embodiment of the invention, the display covers about one-third of the planar surface, and in yet another embodiment of the invention, the display covers about one-half of the planar surface. The planar surface and the door need not be on the same side of the appliance housing. In one embodiment of the present invention, the appliance is a refrigerator. In another aspect of the present invention, the planar surface is on the side of the refrigerator. The appliance may include a display cover for selective covering and uncovering of the display.

In yet another aspect of the present invention, a kitchen appliance includes a housing having an interior, a generally planar surface, appliance controls and a door, the door being movable between an open position at which the interior can be accessed and a closed position, the kitchen appliance including apparatus in the housing for effecting the environment of the interior, as controlled by the appliance controls, a display on the generally planar surface, and a display cover for selective covering and uncovering of the display.

In one aspect of the present invention, the kitchen appliance may be a microwave oven, which includes an infrared receiving port for receiving signals to operate the display and/or kitchen appliance apparatus.

In another aspect of the present invention, the kitchen appliance as described in any of the above embodiments is associated with a separate camera for generating a video.

DETAILED DESCRIPTION OF THE INVENTION

Figure 1:
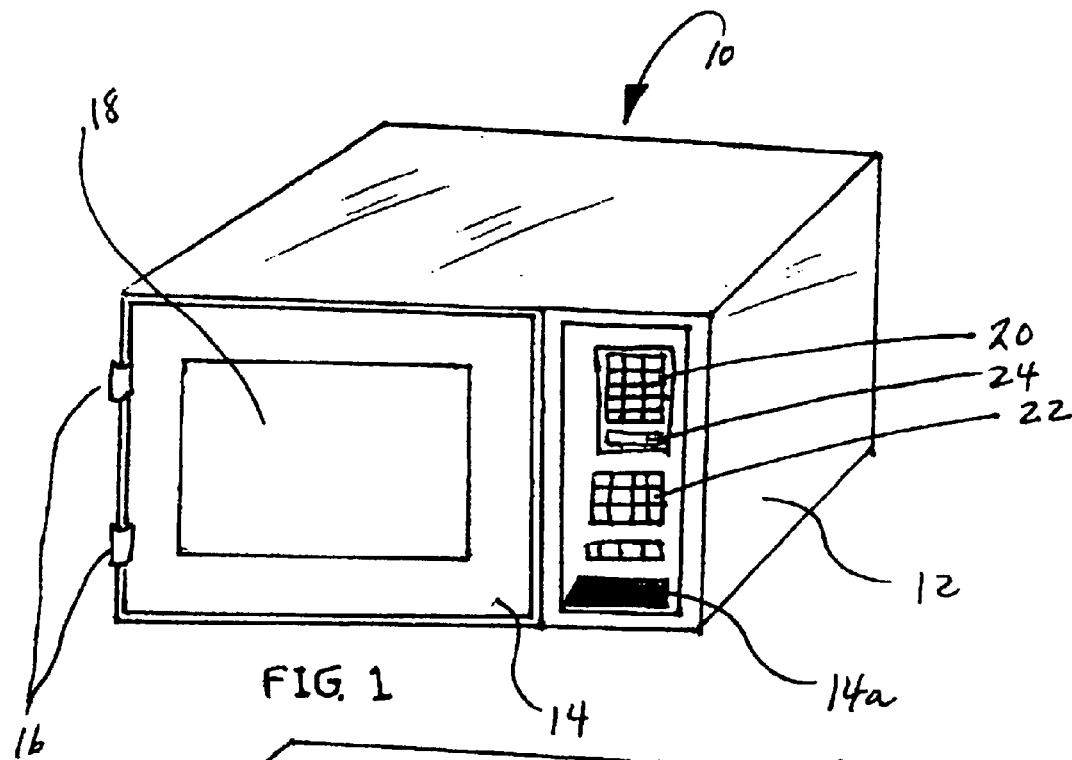
FIG. 1 is a perspective view of a microwave oven in accordance with the present invention, including a video display on the door thereof.

Referring specifically to FIG. 1, there is illustrated a microwave oven generally designated as 10 in accordance with the present invention. The oven 10 includes a housing 12 which embodies a generally planar front surface. The oven 10 includes microwave-generating apparatus for the oven 10 to operate appropriately as a microwave oven. The oven 10 also includes an interior for holding food to be subject to microwave cooking. Desirably, the interior should be as large as the housing, controls and microwave-generating apparatus permit. Microwave ovens vary in size, but the cooking interior should generally be as large as possible.

Oven 10 also includes a door 14 which occupies a relatively large portion of the planar front surface of the oven 10. A door latch releasing button is provided at 14*a*. The door 14 provides access to the cooking interior in which food must be placed and removed following cooking. The door of a microwave oven is generally the same width and height of the cooking interior so that dishware and bowlware that fits through the doorway fits in the interior. In the preferred embodiment, the door 14 opens right to left on hinges 16. The door may, of course, open in any direction. The hinges 16 are desirably of a structure and/or arrangement which permits the hinges 16 to fully and adequately support the door 14. As will be seen below, weight may be added to the door 14 by the additional apparatus therein, thus requiring hinges or other door opening expedients that differ from those provided on known microwave ovens. It is also possible that the thickness of the door itself may have to be increased by reason of the additional apparatus therein. The above with respect to the hinges and thickness of the door is also true with regard to other appliances to which the present invention applies.

A video display 18 is incorporated within door 14 such that the video display can be seen on the microwave when the door is closed, or even when it is open. The video display 18 may display television from a tuner, videos from a VCR or DVD player, video from an external camera or other source, video or text generated by a microprocessor or any other computer related processing unit, or any other video which might be desirable for viewing in a kitchen.

It is also contemplated that still-frame photographs or images can be displayed as well on a monitor incorporated in door 14, the monitor also being designated by the reference numeral 18. Such still-frames might include processed photographs, digital photographs, text (such as messages, recipes, inspirational or prophetic slogans or phrases), artwork, etc. The still-frames can be made to change periodically or remain the same until changed.

The door 14 desirably occupies a relatively large portion of the planar front surface of the microwave oven, preferably about three-quarters or more of such planar front surface area. However, as little as one-quarter or one-third of such planar surface area is preferably occupied by the video display 18 on the door 14 of the microwave 10.

Depending upon the nature of the display 18 to be incorporated within the door 14, shielding of the microwaves within the microwave oven (or whatever else might be occurring within the kitchen appliance in which the display is incorporated) may be required. Such shielding would protect the display 18 and any associated apparatus, as discussed below, from electronic or signal interference, temperature or humidity variations, etc. Appropriate shielding may be selected based on the type of kitchen appliance in which the display is incorporated, and that which needs to be protected to ensure proper operation of the display and its associated apparatus.

The tuner, camera, microprocessor or other video-generating or still-frame generating apparatus may be within the microwave oven 10 itself, or supplied externally via hard-wiring or via signal without wires. The controls for the video display 18 may also be external or incorporated within the microwave oven 10, perhaps even within the door itself. If within the microwave oven 10, the controls may be at 20, adjacent to the controls at 22 for the microwave oven itself. An infrared or other receiving expedient 24 for a remote control can also be incorporated on the front panel. The various controls may also be provided directly on the door 14 itself, or on-screen controls may be provided.

Video display 18 may be generated as television or may even be an LCD or LED or other viewable format. Flat versions of these are known and have been applied to television sets and computer monitors, as well as in other devices incorporating video displays. Flat television and other flat display technology is known to those of skill in the art of display technology. Flat television and other flat display technology can be utilized in the present invention with quite effective results as the door or other portion of an appliance can remain as thin as possible. Some adjustment of the thickness of the door or other area might be necessary, but would be kept to a minimum with the flat display technology.

The above flat video technology could be incorporated within the door 14. As mentioned above, if the weight of door 14 increases such that the hinges or other opening expedients used on conventional microwaves are insufficient, such expedients are desirably changed in structure and/or arrangement so that the door 14 with display are sufficiently supported.

Figure 2:
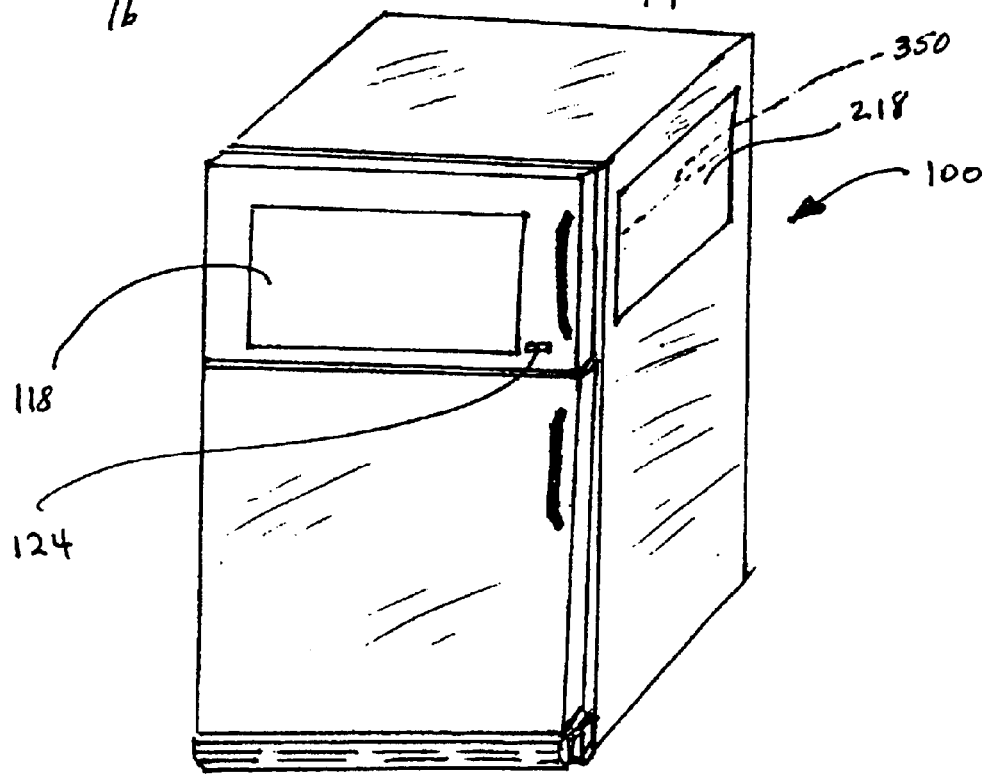
FIG. 2 is a perspective view of a refrigerator in accordance with the present invention, illustrating a video display on the door of the freezer compartment, as well as a video display on the side of the refrigerator, only one of the video displays being incorporated within the refrigerator in the preferred embodiment.

As shown in FIG. 2, the kitchen appliance may also be a refrigerator 100. While the same principles which apply above to the microwave oven 10 apply to the refrigerator 100 and other appliances, the video display 118 on the refrigerator 100 need not constitute the preferred one-quarter or one-third of the front planar surface of the refrigerator 100 because of the size of the refrigerator. Instead, any suitable size may be utilized insofar as the surface area of the refrigerator 100 is quite large. The same is true of other appliances. In the embodiment shown in FIG. 2, a relatively large screen is provided on the upper (often freezer) door of the refrigerator 100. The only control provided is a remote receiving expedient 124. A still-frame display may be particularly appropriate for a refrigerator, as might a message display, where the message to be left might be keyed in from a keyboard so that longer, perhaps scrolling notes might be left.

While the above discusses providing a display on the door of an appliance, another aspect of the present invention concerns the provision of a display on another area of an appliance. Illustrated as an alternative video location on refrigerator 100 in FIG. 2 is a display 218 on the side of the refrigerator. Depending upon how a kitchen is arranged, the side of an appliance may be a particularly useful area for a display, again either video or still-frame.

In accordance with another aspect of the present invention, the display may be one that is hideable by a panel, when such display is not in use. Such a panel may be a sliding panel made as part of the appliance itself, such as panels 350 shown in FIG. 2 by dashed lines in a partially descended position. An entire panel may be incorporated within the housing of an appliance to be slideably moved over the display, or such panel may be a rolled material which can be slid over the display in a manner similar to pulling a shade. The covering of the display with the panel may be accomplished automatically by actuation of controls which operate the same, or it can be moved manually.

While the foregoing illustrates and describes preferred embodiments in connection with the present invention, there are many embodiments which can be developed and are encouraged to be developed, yet remain within the spirit and scope of the claims which follow.

What is claimed is:

1. A kitchen appliance comprising:
   a. a housing having an interior and a door, said door being movable between an open position at which said interior can be accessed and a closed position;
   b. appliance controls;

c. a kitchen appliance apparatus for effecting the environment of said interior, as controlled by said appliance controls;

d. a display integrally and non-portably built within said door for displaying electronic images on said door; and e. at least one hinge, said hinge being modified from that which would be required to support the door without said display and associated components in order to support said door and said associated components.

2. The kitchen appliance in claim 1, further including a television tuner.

3. The kitchen appliance in claim 2, wherein the television tuner is within the said housing.

4. The kitchen appliance in claim 1, further comprising a microprocessor.

5. The kitchen appliance in claim 4, further including a keyboard for controlling said microprocessor.

6. The kitchen appliance in claim 4, wherein said microprocessor is within said housing.

7. The kitchen appliance in claim 1, further including video generating apparatus.

8. The kitchen appliance in claim 7, wherein said video generating apparatus is a camera.

9. The kitchen appliance in claim 7, wherein said video generating apparatus is at least partially in said housing.

10. The kitchen appliance in claim 1, wherein said housing has a planar surface and said door is part of the planar surface, and said display covers about one-third of said planar surface.

11. The kitchen appliance in claim 1, wherein said housing has a planar surface and said door is part of the planar surface, and the display covers about one-half of said planar surface.

12. The kitchen appliance in claim 1, wherein said kitchen appliance is a refrigerator.

13. The kitchen appliance in claim 1, further including a display cover for selective covering and uncovering of said display.

14. The kitchen appliance in claim 1, wherein the appliance controls are part of said housing and the appliance apparatus are in said housing.

15. The kitchen appliance in claim 1, wherein the kitchen appliance is a refrigerator, a dishwasher, a conventional oven, a freezer, or a wine storage unit.

16. The kitchen appliance in claim 1, further comprising a shield protecting the display and associated components from the effected environment in the interior.

\* \* \* \* \*